June 18, 1957    C. E. JONES    2,796,455
THERMOCOUPLE UNIT FOR GRAIN TEMPERATURE MEASURING EQUIPMENT
Filed March 13, 1956    2 Sheets-Sheet 1

INVENTOR.
Clair E. Jones
BY
ATTORNEY.

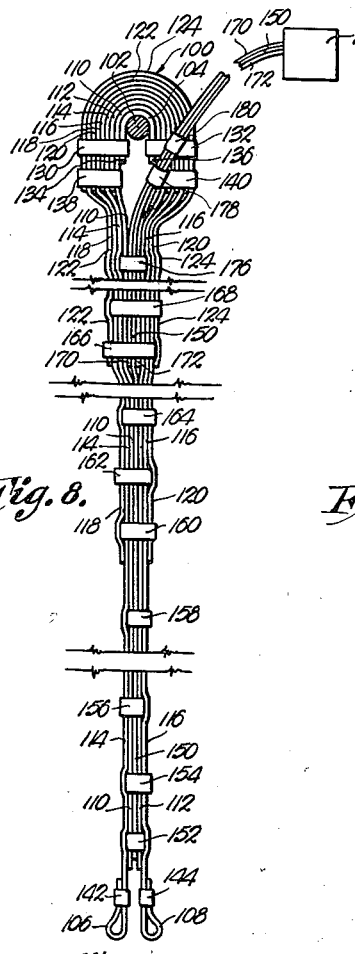

United States Patent Office 2,796,455
Patented June 18, 1957

2,796,455

THERMOCOUPLE UNIT FOR GRAIN TEMPERATURE MEASURING EQUIPMENT

Clair E. Jones, Salina, Kans.

Application March 13, 1956, Serial No. 571,178

16 Claims. (Cl. 136—4)

This invention relates generally to the field of temperature measurements and more particularly to thermocouple units for use in an electrical, temperature indicating system. Still more specifically, the invention contemplates an elongated, relatively flexible, multiple thermocouple unit for use in grain bins or the like.

Electrical systems for the measurement and remote indication of temperatures by the use of thermocouple units within the space where temperature is to be measured together with electrical apparatus for indicating or "reading-out" the temperature measured by the thermocouple unit within such space are generally old and well known to the art. For an example of such a system, reference is made to U. S. Letters Patent No. 705,187, entitled "Multiplex Electric Thermometer," issued July 22, 1905, to Anthony Zeleny. The indicating or "read-out" apparatus for such systems are currently available on the market from, for instance, Minneapolis-Honeywell Regulator Co. of Philadelphia, Pennsylvania, and Leeds & Northrop of Philadelphia, Pennsylvania, and others. The thermocouple unit of this invention may be used with indicating or "read-out" apparatus of the same general type as one of those currently available on the market, and, since such indicating apparatus or system forms no part of the present invention, detailed description of such systems and apparatus may be omitted.

Prior types of multiple point, temperature sensing units intended for use in grain bins or the like have all been subject to various disadvantages, some of the more notable of which are a vulnerability to breakage due to rigid construction, limited capacity for carrying wires, susceptability to stretching, unnecessary complexity resulting in high manufacturing and installation costs, constructional attributes limiting the use of the unit to permanent installations and requiring that a bin or the like be emptied in order for installation to be made, constructional configurations having objectionable weights or unduly subject to wear, and others known to those familiar with this art.

Accordingly, it is the primary object of this invention to provide an improved multiple point, temperature sensing unit overcoming all of the above-mentioned and other disadvantages inhering in prior devices intended for use in the same general applications.

It is thus an important object of the invention to provide such an improved temperature sensing unit utilizing superimposed, elongated, relatively flexible strips of metal to act as the housing or armoring means for a plurality of spaced temperature sensing elements and the conductors associated with the latter, such strips being arranged to provide great overall strength and full protection for the sensing elements and conductors without impairing the flexibility of the unit. Although for purposes of illustration the unit is largely described hereinafter with reference to the use of bimetallic, thermocouple type sensing elements, those skilled in the art will perceive that the use of other temperature sensing elements or transducers, such as those of the thermistor or semiconductor, high resistance coefficient wire, and other types, is practicable and contemplated by this invention.

Another important object of this invention is to provide an elongated, relatively flexible unit of low weight and high strength which is of simple and straight-forward nature permitting mass production at low cost and which is of nature subjecting the same to a minimum of wear and requiring little or no maintenance.

Another important object of this invention is to provide such a unit which is adapted to be easily and quickly installed in bins containing grain or the like, as well as in empty bins, and which is of nature adapting the same for use in situations where it is desired to move the unit between different bins or locations in the same bin.

Another important object of this invention is to provide such a unit which may be conveniently shipped or stored in small space and in condition for immediate installation without the necessity of any further assembly work upon the unit itself at the point of installation.

It is another important object of this invention to provide such a unit which, because of its simplicity is adapted for making, and continuing to make over long periods of years, temperature measurements of increased accuracy over those available from conventional thermocouple units intended for use in similar applications.

Still other important objects of this invention, including certain significant details of construction, will be made clear or become apparent as the following description of the invention progresses.

In the accompanying drawing:

Fig. 8 is an edge elevational view of a somewhat more complex embodiment of unit contemplated by the invention, which is currently preferred, particularly where the bin depths or expected strains are relatively great;

Fig. 9 is an elevational view of one side of the unit of Fig. 8;

Fig. 10 is an elevational view of the other side of the unit of Fig. 8;

Fig. 11 is a cross sectional view taken on line XI—XI of Fig. 10;

Fig. 12 is a cross sectional view taken on line XII—XII of Fig. 10;

Fig. 13 is an essentially schematic view of the relationship between conductors in a unit using soldered thermocouple junctions for temperature sensing elements;

Fig. 14 is a fragmentary, elevational view of a portion of the length of the unit of Fig. 8 with parts being broken away and enlarged for clarity of illustration; and Fig. 15 is an essentially schematic view of the relationship between conductors and resistance or semi-conductor type sensing elements in a modified unit utilizing the latter.

Figure 1:
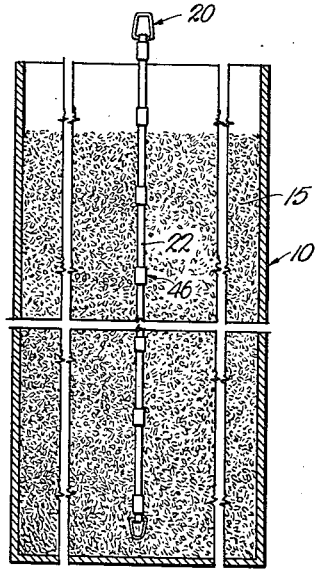
Figure 1 is a cross sectional view of a bin or the like having, for example, grain therein and showing one of the temperature sensing units contemplated by this invention in operative disposition therewithin.
Figure 5:
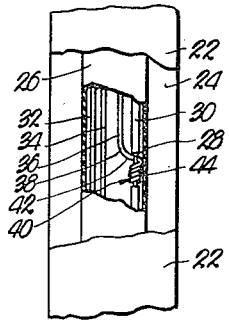
Fig. 5 is a fragmentary, elevational view of a portion of the length of the unit of Fig. 2, with parts being broken away and enlarged for clarity of illustration.
Figure 6:
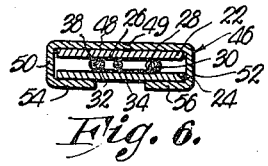
Fig. 6 is a cross sectional view taken on line VI—VI of Fig. 2.
Figure 7:
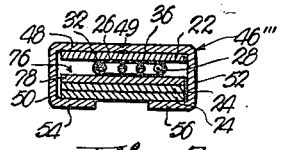
Fig. 7 is a cross sectional view taken on line VII—VII of Fig. 2.

Referring now first to Figs. 1–7 inclusive of the drawings, the numeral 10 generally designates a bin or the like having a quantity 15 of grain or the like stored therewithin. The numeral 20 generally designates one embodiment of temperature sensing unit contemplated by this invention, the unit 20 shown in Fig. 1 being illustrated as in its normal operative condition in which it extends substantially vertically down within the bin 10 through the grain 15 with the lowermost end of the unit 20 adjacent the bottom of the bin 10 and the uppermost end of the unit 20 above the level of grain 15.

The unit 20 includes a pair of elongated, flat, relatively flexible, metallic strips 22 and 24 extending in spaced, longitudinally parallel and substantially co-extensive, side-by-side, proximate relationship.

Disposed in longitudinally extending relationship between the strips 22 and 24 is an elongated, flexible, tubular jacket 26 of somewhat flattened, transverse cross sectional configuration and formed of insulating material, for instance, impregnated cloth similar to a high grade of what is commonly referred to as "electricians' friction tape." The width of the jacket 26 is substantially less than that of the strips 22 and 24 and is so disposed between the strips 22 and 24 that the width of the jacket is centered upon the widths of the strips 22 and 24 leaving a longitudinal zone of each of the latter extending laterally in outwardly overlapped relationship to the jacket 26.

Within the jacket 26 and extending substantially the length of the strips 22 and 24 is an elongated, relatively flexible, conductive wire 28 formed of a particular, preselected metal and preferably provided with an insulating covering 30, which may be of any suitable, conventional nature, that shown for purposes of illustration being a cloth fiber covering.

Also disposed within the jacket 26 and extending different distances downwardly from adjacent the normally uppermost end of the strips 22 and 24 are a plurality of elongated, relatively flexible, conductive wires 32, 34 and 36 formed of a different metal from that of which wire 28 is formed. It will be noted that the unit 20 chosen for illustration utilizes the thermocouple principle of temperature sensing, hence the difference in metals between wire 28 and wires 32, 34 and 36. (Other types of sensing elements which might be used are hereinafter referred to in connection with Fig. 12.) Wires 32, 34 and 36 are each individually insulated by any suitable, conventional means, the insulation shown for purposes of illustration being an enamel covering as at 38.

The choice of metals of which wire 28 and wires 32, 34 and 36 are respectively formed may vary considerably and may consist of any two metallic materials having suitable strength characteristics which are adapted for use, when interconnected, in presenting an electrical, thermocouple junction. A preferred combination of materials is to form the wire 28 of a nickel copper alloy and to form the wires 32, 34 and 36 of copper. Another combination of materials illustrative of the many available would be to form the wire 28 of iron and the wires 32, 34 and 36 of copper.

Thermoelectric or thermocouple junctions are formed at predetermined intervals spaced along the length of wire 28 as generally indicated at 40, whereat a thermocouple junction between the wire 36 and the wire 28 is shown. As will be clear from Figs. 5, 6 and 7, the wires 32 and 34 extend on downwardly within the jacket 26 beyond the junction 40 between wires 36 and 28 and are respectively coupled with the wire 28 at predetermined distances below the coupling of wire 36 with wire 28 by means of thermocouple junctions similar to that illustrated at 40. It should also be pointed out that three wires 32, 34 and 36 are shown for purposes of illustration, but that either a lesser or a substantially greater number of same could be provided, the latter construction being particularly contemplated. The junction 40 is effected by stripping the insulation 38 from the conductor 36 as at 42 and then coiling the bared portion 44 of wire 36 around a portion of wire 28 which has been bared by stripping the insulation 30 back from a short length thereof. If desired, solder or other suitable means could be provided for holding the coiled portion 44 of wire 36 in condition for tight engagement and electric connection with the wire 28. Obviously, the thermocouple junction between wire 32 and wire 28 will normally be adjacent the lowermost ends of strips 22 and 24. It will be understood that, where a type of temperature sensing elements other than thermocouple junctions is to be used, for instance, thermistors, the latter will be coupled between the wire 28 and the lower ends of the wires 32, 34 and 36, and that all of wires 28, 32, 34 and 36 may in such instances be of the same material.

The strips 22 and 24 are held in their above described relationship and in opposite engagement upon the jacket 26 by means of a plurality of clamp elements generally designated 46 disposed along the strips 22 and 24 at spaced intervals. Although the concepts of the invention are not to be deemed as necessarily so limited, it may be observed that a typical embodiment of the unit 20 will have strips 22 and 24 of width of the order of one-half to one inch and that the clamp elements 46 may be disposed at intervals of the order of one foot along the lengths of the strips 22 and 24. Obviously, the lengths of the strips 22 and 24 may vary considerably and will depend upon the depth of the bin 10 to be served.

Each of the clamp elements 46 is preferably of substantially U-shaped transverse cross section and has a bight portion 48 of substantially the same width as the strips 22 and 24 in engagement with the side of strip 22 opposite strip 24, a pair of leg portions 50 and 52 extending from bight portion 48 around the opposite edges of strips 22 and 24 in close proximity to such edges in order to confine the strips in proper, side-by-side relationship, and a pair of opposed, inwardly extending arm portions 54 and 56 upon the extremities of leg portions 50 and 52 respectively and in engagement with the side of strip 24 opposite strip 22. Obviously, the clamp elements 46 may be of initially U-shaped cross section and the arm portions 54 and 56 bent down into engagement with the strip 24 during the manufacture and assembly of the unit 20. The bight portion 48 of each clamp element 46 is preferably fixedly secured to one or the other of the strips 22 and 24 by spot welding or the like as at 49, the arm portions 54 and 56 of at least some of the intermediate clamps 46 preferably engaging the other of the strips 22 and 24 with force insufficient to prevent a certain degree of frictionally resisted, relative sliding movement between the strips 22 and 24, in order to equalize strains.

Figures 2, 3, 4:
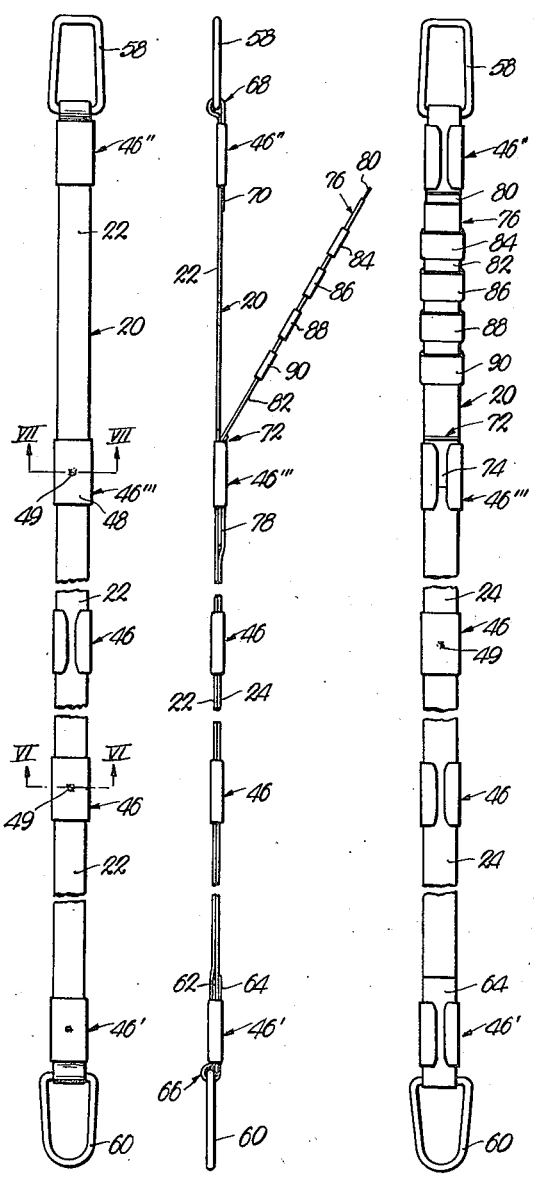
Fig. 2 is an elevational view of one embodiment of such a unit per se, taken from one side thereof.
Fig. 3 is an elevational view of the unit of Fig. 2 taken from one edge thereof.
Fig. 4 is an elevational view of the unit of Fig. 2, taken from the opposite side thereof to the one illustrated in Fig. 2.

A pair of ring-like members 58 and 60 are provided at the opposite ends of the unit 20. As best shown in Fig. 3, the lowermost end portion of strip 24 is passed through ring 60 and then bent back upwardly upon itself as at 62. Similarly, the strip 22 passes over bent back, end portion 62 of strip 24 and through ring 60 and is then itself bent back upwardly in engagement with strip 24 as at 64. A clamp element 46' is provided immediately above the ring member 60 and serves to hold the downwardly extending, lowermost portions of strips 22 and 24 and their respective bent back, upwardly extending portions 64 and 62 in tightly clamped relationship securing the ring member 60 in loops of the strips 22 and 24 as at 66 at their lowermost ends.

Ring member 58 is similarly attached to strip 22 by a portion of the latter looped as at 68 and bent downwardly upon itself as at 70, the loop 68 being about or through the member 58. The bent down portion 70 of strip 22 is rigidly secured or clamped to the uppermost, upwardly extending portion of strip 22 by a clamp element designated 46".

The uppermost end of strip 24 terminates somewhat below the uppermost end of strip 22 and the ring member 58 and is looped as at 72 and bent back downwardly upon itself as at 74 (see Fig. 4). Extending downwardly between strip 22 and the strip 24 adjacent the length 74 of the latter is a connector assembly broadly designated 76. As will be clear from Fig. 7, a clamp element 46''' is utilized immediately below the loop 72 of strip 24 to bind the strip 22, the lowermost extremity of assembly 76, which is designated 78 for purposes of identification, the strip 24 and the bent back portion 74 of the latter together.

It may be observed that the clamp elements 46, 46', 46'' and 46''' may all be initially identical, the only difference between same in the completed unit 20 being the relatively greater lengths of the leg portions 50 and 52 and the relatively lesser lengths of the arm portions 54 and 56 resulting from the increased thickness of the parts clamped between the bight portion 48 and the arm portions 54 and 56.

The upper portion of the assembly 76 above portion 78 thereof and the loop 72 of strip 24 is preferably angled away from the corresponding length of strip 22 in order to provide easy access in making certain electrical connections, as will hereinafter be made more clear. The assembly 76 could assume many different forms; however, the construction about to be described has been found particularly advantageous in apparatus such as the unit 20, both from the operational and manufacturing points of view.

The assembly 76 illustrated includes a metallic strip 80 of relatively short length covered by a tubular insulating covering 82 which may, for instance, be formed of material similar to that used for electricians' friction tape. Mounted upon the assembly 76 at spaced intervals, but electrically insulated from the strip 80 by covering 82 or otherwise, are a plurality of conductive contacts 84, 86, 88 and 90. The uppermost lengths of wires 28, 32, 34 and 36 are passed upwardly along the strip 80 but insulated therefrom either by an uppermost length of the jacket 26 or, if desired, by the configuration of the covering 82. Each of such wires 28, 32, 34 and 36 is then electrically connected to a corresponding one of the contacts 84, 86, 88 and 90. The assembly 76 thus, by means of the contacts 84, 86, 88 and 90 respectively connected with wires 28, 32, 34 and 36 provides a convenient and efficient means for making releasable connection of the wires 2, 32, 34 and 36 with the indicating or "read-out" portion of the overall system with which the unit 20 is used.

In operation, it is contemplated that during periods of transportation or disuse, the unit 20 may be conveniently coiled or spiraled upon itself to occupy a small space. It may also be observed that the construction of the unit 20 is such that the weight of same is relatively small, even for units 20 of relatively great length.

For a permanent installation of a unit 20 within a bin 10 the ring 60 may be weighted with a free weight at the bottom of the bin 10 and the ring 58 secured adjacent the top of bin 10 above the level of grain 15, the free weight maintaining the substantially vertical disposition of the unit 20 while the bin 10 is being filled with grain 15, but permitting a certain degree of lateral shifting of the unit 20 to prevent unnecessary strain thereon while the bin 10 is being filled. However, such securement could also be by other conventional means forming no part of this invention. It is important to note, however, that, due to the flexibility and small transverse cross section of the unit 20 of this invention, same may be conveniently installed in a bin 10 which is filled with or contains a qantity of grain 15. Such installation may be accomplished in various manners, the preferred of which is to utilize a long rigid pole (not illustrated), which may be constructed in detachable sections, and which is provided with some sort of hook or the like (not illustrated) on the lowermost end thereof which is adapted to be releasably engaged within the ring 60. The installation is then carried out by engaging such hook within the ring 60 and forcing the pole downwardly through the grain 15 until the bottom of bin 10 or the desired depth in grain 15 is attained by the ring 60. The lowermost end of the unit 20 will then be at the desired position with the unit 20 extending substantially vertically upwardly therefrom through the grain 15 and to a point above the level of the latter. Electrical connection between the unit 20 is, as indicated, effected through the contacts 84, 86, 88 and 90 of the connector assembly 76.

As will be clear, the unit 20 may be, by virtue of its flexibility and small transverse cross section, readily removed from any particular bin 10 and quickly installed within another bin 10 or at a different position therein.

It will now be apparent that the unit 20 is ideally suited for the solution of the problems existing in this field which prior devices have been incapable of overcoming. Of particular note is the fact that the nature of the unit 20 permits its manufacture at such low cost and its installation in such inexpensive, convenient manner. The strips 22 and 24 being formed, as they preferably are, of steel, render the unit 20 inherently of great strength and resistance to wear, while still being relatively flexible. Moreover, the nature of the unit 20 is such that the strips 22 and 24 obviously give more than adequate protection against any damage to the wires 28, 32, 34 and 36, which form the electrically operative portions of the device.

Reference is next made to Figs. 8–12 inclusive wherein is shown a heavier duty embodiment of the invention which is preferred for use where a unit of unusual strength is required. Such modified unit is generally designated by the numeral 100 and it will be seen is generically similar in its broader aspects to the unit previously described, although including certain further improvements over the latter as will become apparent from the following description of the unit 100.

The lower portion of a ring-like member which may be similar to the members 58 and 60 or might alternately consist of an eyebolt is indicated in Fig. 8 by the numeral 102. Supported upon the member 102 is a relatively rigid metallic strap 104 of inverted, U-shaped configuration.

An elongated, flat, relatively flexible, metallic strip 110 normally extends from a position below the member 104 roughly approximate the intended length of the unit 100 upwardly over and around the strap 104 and terminates slightly below the latter on the opposite side thereof. A second strip 112 coextensive in length and otherwise identical to the strip 110 similarly extends upwardly and passes over and around the strap 104 in a direction opposite to strip 110, it being noted that the strip 110 is actually interposed between the strip 112 and the strap 104. Strip 112, like strip 110 terminates at its uppermost end slightly below the strap 104 but on the opposite side of the latter from the strip 110.

It will be noted that the strips 110 and 112 are, throughout the major portion of their lengths, disposed with their adjacent flat faces in spaced, opposed parallelism, the temperature sensing elements and associated conductive means hereinafter to be described being disposed therebetween.

Respectively superimposed upon strips 110 and 112 are generally similar strips 114 and 116, which are slightly longer than the strips 110 and 112 and are each bent back upwardly upon themselves for a short distance at their lowermost extremities to present loops 106 and 108 on strips 114 and 116 respectively. Strips 114 and 116 extend below the lowermost ends of strips 110 and 112, and the loops 106 and 108 are also preferably below the lowermost ends of strips 110 and 112. The strips 114 and 116 at their uppermost extremities are successively passed over and around the strap 104 and terminate oppositely slightly therebelow in the same manner as described in connection with strips 110 and 112, it being noted that strip 114 actually engages the outermost face of strip 112 as it passes around the strap 104, while strip 116 is actually laid over the top of strip 114.

A pair of generally similar strips 118 and 120 are respectively superimposed upon the outermost faces of strips 114 and 116, but are of considerably lesser length so as to terminate some distance above the lowermost extremities of strips 114 and 116. The strips 118 and 120 pass over and around the strap 104 in opposite directions and oppositely terminate slightly therebelow in the same manner as described for strips 114 and 116, for instance.

The strips 118 and 120 thus provide an additional two thicknesses of armor throughout some upper fraction of the unit 100, which in the illustrated embodiment would be about the upper two-thirds of the unit 100.

In like manner, a pair of strips 122 and 124, also similar to strips 110 and 112, are respectively superimposed upon strips 118 and 120 commencing at a zone of the latter spaced substantially above the lowermost extremities thereof. Strips 122 and 124 pass oppositely over and terminate beneath the strap 104 in the same manner as previously described. In the illustrated embodiment, the strips 122 and 124 provide an additional two layers of armor throughout approximately the upper third of the length of the unit 100.

A pair of clamp elements 130 and 132 generally similar to the clamp elements 46 described in connection with the unit 20 but of larger dimensions have their bight portions disposed in overlying relationship to and preferably spot welded to the strip 124 on the opposite sides of the strap 104 just below the member 102. The opposed inwardly extending arm portions of the clamp elements 130 and 132 tightly embrace the depending legs 134 and 136 respectively of the strap 104 and may, if desired, be spot welded thereto to tightly hold the uppermost portions of the strips 110–124 inclusive relative to each other and the strap 104. Although only a single pair of clamp elements 130 and 132 are illustrated, it will be understood that additional pairs thereof could be provided if desired.

In the illustrated preferred embodiment a pair of similar clamp elements 138 and 140 have their bight portions embracing and preferably welded to the strip 124 below the strap 104 and on opposite sides of the latter, the opposed, inwardly extending arm portions of such clamp elements 138 and 140 respectively embracing in tight relationship the innermost faces of the strips 110 and 112.

Similar clamp elements 142 and 144 are used to respectively clamp and hold the upwardly bent lowermost portions of strips 114 and 116 presenting loops 106 and 108.

Disposed between the lowermost major portion of the strips 110 and 112 is an elongated insulating jacket 150 generally similar to the jacket 26 above described and enclosing therewithin the temperature sensing elements and conductive means hereinafter to be described.

At least one clamp element 152 of the same general nature as the other clamp elements heretofore and hereafter to be referred to is provided adjacent the lowermost extremities of the strips 110 and 112 and preferably has its bight passing around and welded to the strip 110 at its oppositely inturned arm portions tightly gripped upon the opposite face of strip 112. Manifestly, a plurality of elements 152 may be used, in which case they are preferably disposed alternately with respect to the strips 110 and 112 with certain of same welded to the strip 110 and others welded to the strip 112 with their arms embracing the strip 110.

Spaced at any desired interval along the major portion of the unit 100 above the clamp element 152 are a number of alternately disposed clamp elements 154, 156, 158, 160, 162, 164, 166 and 168. The enumerated clamp elements are shown as being illustrative, and it will be understood that a considerably greater number of such elements will actually be provided in a working embodiment of the unit 100. To illustrate the manner in which such elements are applied, however, the element 154 has its bight portion superimposed upon and preferably welded to the strip 116 and its inwardly turned arms oppositely engaging the strip 110, it being noted that the arms of the clamp elements 154–168 inclusive preferably engage the corresponding strip with sufficient force to offer some frictional resistance to relative longitudinal movement between the strips included within its embrace, but without engaging the same so tightly as to preclude a degree of such relative longitudinal movement of strips for minimizing or equalizing strains between the strips. The clamp element 156 is alternated in disposition from the clamp element 154 and has its bight portion passing around and welded to the strip 114 while its inwardly extending arms embrace the opposite face of the strip 112.

It will be noted that the inwardly turned arm portions of clamp elements 154, 156, etc. actually engage the strip which is once removed from being the outermost strip on the side of the unit 100 opposite the outermost strip which the bight portion of such element passes around and is preferably secured to. Thus, the strip 114 passes around and is disposed outwardly of the arm portions of clamp element 154, while the strip 116 similarly passes around the arm portions of the clamp element 156.

In like manner, clamp element 158 has its bight portion passing around the strip 116 and its arm portions engaging the opposite face of strip 110; the clamp element 160 has its bight portion passing around the strip 120 and its arm portions engaging the opposite face of strip 114; the clamp element 162 has its bight portion passing around strip 118 and its arm portions engaging the opposite face of strip 116; the clamp element 164 has its bight portion passing around strip 120 and its arm portions engaging strip 114; the clamp element 166 has its bight disposed about the strip 122 and its arm portions engaging strip 120; and the clamp element 168 has its bight superimposed upon the outermost face of strip 124 and its arm portions extending about the outermost face of strip 118.

Inserted between the strips 110 and 112 on opposite sides of the jacket 150 are a pair of elongated strips 170 and 172 which may extend downwardly throughout a portion of the length of the unit 100 including the strips 122 and 124 thereof any suitable distance so as to be retained within the unit 100 by clamp elements such as 166 and 168. The uppermost extremities of strips 170 and 172, which have the jacket 150 therebetween, are bent out to diverge laterally from the remainder of the strips of the unit 100 and lead to a point at which electrical connections are to be made with the conductive means carried within jacket 150. As illustrated in Fig. 8, such strips 170 and 172 may extend in oppositely embracing protective relation to the jacket 150 into a suitable terminal box or the like 174.

Immediately below the zone of divergence of the strips 170 and 172 from the remainder of the strips of the unit 100 is preferably provided one or more clamp elements 176 embracing not only the strips 170 and 172 and jacket 150 therebetween but also the strips 110 and 112 disposed outwardly of the strips 170 and 172 and adjacent thereto. The bight portion of clamp element 176 illustrated is preferably welded or otherwise secured to the outermost face of strip 110 which it surrounds, while the inwardly extending opposed arms of the clamp element 176 should be tightly engaged upon the outermost face of strip 112.

Suitable clamp elements as at 178 and 180 are provided at spaced intervals along that portion of the length of strips 170 and 172 leading from the main portion of unit 100 to the terminal box or other zone for electrical connection as at 174.

Referring more particularly to the cross sectional views of Figs. 11 and 12, the relationship between the various strips and the clamp elements 168 and 156 are shown. The bight portions of each of said clamp elements are indicated by the numeral 182 while the inwardly extending opposed arm portions of such clamp elements are designated 184 and 186 for identification. The points of possible securement as by spot welding are indicated by the numeral 188. The nature of the clamp elements 156 and 168, as well as the other clamp elements above described as similar, will thus be manifest as being of the same general form as the clamp element 46 described in connection with the unit 20, although the clamp elements used with the unit 100 will obviously be of varying sizes and dimensions to accommodate therewithin the particular number of strips to be embraced thereby.

Referring next to Fig. 14 it will be seen that the jacket 150 carries a common conductor 190 preferably insulated as at 192 except for an exposed strip 194 to which may be connected as by soldering at 196 the exposed end 198 of one of the plurality of preferably insulated conductors 200, 202 and 204, the latter conductors 200, 202 and 204 being of a material different from the conductor 190 so as to provide a thermocouple type, temperature sensitive junction at the soldered interconnection 196.

Fig. 13 diagrammatically represents the relationship of conductors where thermocouple type junctures are used as temperature sensing elements, it being understood that the points of soldering or other interconnection 196, 196', 196" between conductor 190 and conductors 200, 202 and 204 respectively will be spaced at intervals along the length of the unit 100 in the same manner as described in connection with the unit 20. An alternative type of temperature sensing means is diagrammatically illustrated in Fig. 15 in which it will be understood that the conductors 190, 200, 202 and 204 may be of the same material with thermistors or resistance type temperature sensing elements 206, 208 and 210 connected between the conductor 190 and conductors 200, 202 and 204 respectively in the place of the direct connections 196, 196' and 196" utilized in the thermocouple system illustrated in Fig. 13.

It will be appreciated by those skilled in the art that the embodiment of unit 100 chosen for illustration and description is exemplary of the application of the principles of this invention in working embodiments, but that the number of strips used may vary depending upon the desired length of the unit 100 and the number of clamp elements may be rather widely varied within the limits of maintaining the strips in proper superimposed relationship without unduly impairing the desired flexibility of the unit.

It will also be apparent that free weights or the like (not shown) may be connected in any suitable fashion with the looped portions 106 and 108 of strips 114 and 116 to maintain the unit 100 in substantially vertical disposition when installed. It is most significant to further note that the manner in which the various strips of the unit 100 are held in proper superimposed relationship by the clamp elements described is such as to permit relative longitudinal movement between the various strips to minimize and avoid undue stresses. It should also be pointed out that, although the form of clamp elements illustrated and described herein as at 46 and 154 et seq., for instance, constitute the preferred means for holding the strips in their desired relationship, other means could conceivably be employed, for example, lengths or coils of wire or the like wound either about substantially the entire length of the strips or at spaced intervals therealong.

It will be obvious that a number of minor changes or modifications could be made from the exact structure disclosed for purposes of illustration, and it is, accordingly, to be understood that this invention should be deemed limited within its fair intention only by the scope of the appended claims.

Having thus described the invention, what is claimed as new and desired to be secured by Letters Patent is:

1. An elongated, relatively flexible, multiple point, temperature sensing unit for use in grain bins or the like, said unit comprising a plurality of elongated, flat, relatively flexible, metallic strips in side-by-side, proximal relationship, a pair of said strips being spaced apart to present an elongated, protected space therebetween and extending longitudinally thereof; a plurality of temperature sensing means within said space and spaced at intervals therealong; electrically conductive means within the space and extending longitudinally therealong, said conductive means being insulated from the strips and electrically coupled with the sensing means; structure holding the strips in said relationship without destroying the flexibility thereof; and apparatus for making electrical connection with said conductive means adjacent one end of the space.

2. In a unit as set forth in claim 1, wherein said plurality of strips includes at least one elongated, flat, relatively flexible, metallic strip superimposed on each of said pair of strips respectively outwardly thereof.

3. In a unit as set forth in claim 1, wherein said plurality of strips includes a plurality of elongated, flat, relatively flexible, metallic strips superimposed on each of said pair of strips respectively outwardly thereof, certain of said plurality of strips terminating in spaced relationship above the normally lowermost extremities of said pair of strips.

4. In a unit as set forth in claim 1, wherein said structure holds at least certain portions of certain of said strips sufficiently loosely to permit relative longitudinal movement therebetween.

5. In a unit as set forth in claim 1, wherein is provided a top support member, at least a part of said strips are looped over said member, and there is provided means holding said part of the strips in said looped relationship to the member.

6. In a unit as set forth in claim 1, wherein said sensing means comprise thermocouple junctions.

7. In a unit as set forth in claim 1, wherein said sensing means comprise temperature responsive, semi-conductor elements.

8. In a unit as set forth in claim 1, wherein said sensing means comprise temperature responsive, resistance elements.

9. An elongated, relatively flexible, multiple point, temperature sensing unit for use in grain bins or the like comprising at least a pair of elongated, flat, relatively flexible, metallic strips in spaced, longitudinally parallel and substantially coextensive, side-by-side, proximate relationship; a first elongated, relatively flexible conductor formed of a certain metal and extending longitudinally between the strips throughout a major portion of the lengths of the latter; a plurality of other elongated, relatively flexible conductors formed of different metal than said first conductor and extending longitudinally between the strips from adjacent one end of the latter for differing distances, the ends of said other conductors remote from said one end of the strips each being electrically connected with said first conductor at points respectively spaced along the length of the latter; means electrically insulating said first and said other conductors from the strips and from each other except for connections between each other conductor and said first conductor at said points; and structure embracing the strips to maintain the latter in said relationship without destroying their joint flexibility.

10. In the unit as set forth in claim 9, wherein said means includes an elongated, flexible, tubular jacket of insulating material extending between said strips and having said conductors extend therewithin.

11. In the unit as set forth in claim 10, wherein said means includes individual coverings of insulating material upon each of said other conductors respectively.

12. In the unit as set forth in claim 10, wherein said jacket is of flattened, transverse cross sectional configuration and of width substantially less than the strips, the width of the jacket being substantially centered upon the widths of the strips between which it is disposed.

13. In the unit as set forth in claim 9, wherein said structure comprises a plurality of clamp elements, each element being of substantially U-shaped cross section and having a bight portion in engagement with the side of one strip opposite the other strip and a pair of spaced leg portions respectively extending around the opposite edges of both strips, each of said elements being provided with a pair of opposed arm portions extending toward each other from the extremities of the leg portions remote from the bight portion, said arm portion being in engagement with the side of said other strip opposite said one strip.

14. In the unit as set forth in claim 9, wherein is provided a ring member, and means securing said member to one of the strips at one end of the unit.

15. In the unit as set forth in claim 9, wherein is provided an assembly having a conductive contact for each of said conductors respectively, said assembly being disposed adjacent said one end of the strips, each of said contacts being electrically insulated from the others, each of said conductors being connected at the end thereof adjacent said one end of the strips with a corresponding contact.

16. An elongated, relatively flexible, multiple point sensing unit for use in grain bins or the like, said unit comprising a plurality of elongated, flat, relatively flexible, metallic strips in side-by-side, proximal relationship, a pair of said strips being spaced apart to present an elongated, protected space therebetween and extending longitudinally thereof; a plurality of means for sensing a physical parameter within said space and spaced at intervals therealong; electrically conductive means within the space and extending longitudinally therealong, said conductive means being insulated from the strips and electrically coupled with the sensing means; structure holding the strips in said relationship without destroying the flexibility thereof; and apparatus for making electrical connection with said conductive means adjacent one end of the space.

No references cited.